(12) United States Patent
Xiong et al.

(10) Patent No.: US 12,413,822 B2
(45) Date of Patent: Sep. 9, 2025

(54) BULLET-SCREEN COMMENT DISPLAY

(71) Applicant: SHANGHAI BILIBILI TECHNOLOGY CO., LTD., Shanghai (CN)

(72) Inventors: Mengyuan Xiong, Shanghai (CN); Shuai Shao, Shanghai (CN); Hanlin Li, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 6 days.

(21) Appl. No.: 18/493,763

(22) Filed: Oct. 24, 2023

(65) Prior Publication Data

US 2024/0214644 A1  Jun. 27, 2024

(30) Foreign Application Priority Data

Dec. 21, 2022  (CN) .......................... 202211654601.5

(51) Int. Cl.
*H04N 21/47* (2011.01)
*H04N 21/431* (2011.01)
*H04N 21/4788* (2011.01)

(52) U.S. Cl.
CPC ..... *H04N 21/4788* (2013.01); *H04N 21/4312* (2013.01)

(58) Field of Classification Search
None
See application file for complete search history.

(56) References Cited

U.S. PATENT DOCUMENTS

2020/0007940 A1* 1/2020 Li .................. H04N 21/4788
2020/0014876 A1* 1/2020 Li .................. H04N 21/4756
(Continued)

FOREIGN PATENT DOCUMENTS

CN  108540850 A  9/2018
CN  108696767 A  10/2018
(Continued)

OTHER PUBLICATIONS

Notice of Allowance of the counterpart CN application No. 202211654601.5, official mailing date: Oct. 8, 2024, 8 pages.
(Continued)

*Primary Examiner* — Mushfikh I Alam
(74) *Attorney, Agent, or Firm* — FisherBroyles, LLP

(57) ABSTRACT

A bullet-screen comment display method is provided. The method includes: obtaining a to-be-displayed bullet-screen comment; placing the to-be-displayed bullet-screen comment into a target bullet-screen comment track at a target bullet-screen comment layer when the to-be-displayed bullet-screen comment meets a preset placement condition, where the target bullet-screen comment layer is one of several bullet-screen comment layers, and the target bullet-screen comment track is one of bullet-screen comment tracks at the target bullet-screen comment layer; and displaying the to-be-displayed bullet-screen comment in the target bullet-screen comment track based on a bullet-screen comment configuration, where the bullet-screen comment configuration includes at least a preset angle between a moving direction of the to-be-displayed bullet-screen comment and a horizontal direction or a vertical direction.

17 Claims, 13 Drawing Sheets

(56) References Cited

U.S. PATENT DOCUMENTS

| | | | |
|---|---|---|---|
| 2020/0356782 A1* | 11/2020 | Liu | G06V 20/10 |
| 2021/0118233 A1* | 4/2021 | Duan | H04L 67/52 |
| 2021/0287379 A1* | 9/2021 | Zheng | G06T 13/80 |
| 2023/0306192 A1* | 9/2023 | Xiao | G06F 40/169 |
| 2025/0056068 A1* | 2/2025 | Fang | H04N 21/431 |

FOREIGN PATENT DOCUMENTS

| | | | |
|---|---|---|---|
| CN | 111796825 A | 10/2020 | |
| CN | 111796826 A | 10/2020 | |
| CN | 114025225 A | 2/2022 | |
| CN | 115222860 A | 10/2022 | |
| WO | 2019006939 A1 | 1/2019 | |
| WO | 2022062903 A1 | 3/2022 | |

OTHER PUBLICATIONS

Notice of Allowance of the counterpart CN application No. 202211654601.5 (Official mailing date: May 1, 2025), 4 pages.

\* cited by examiner

BULLET-SCREEN COMMENT DISPLAY

CROSS-REFERENCE TO RELATED APPLICATIONS

This application claims priority to Chinese Patent Application No. 202211654601.5, filed on Dec. 21, 2022, the entire content of which is hereby incorporated by reference in its entirety for all purposes.

TECHNICAL FIELD

This application relates to computer technologies, and in particular, to bullet-screen comment displaying.

BACKGROUND

A video bullet-screen comment (which is also referred to as a video marquee) is an instant subtitle comment function. With rapid development of the Internet, the video industry (for example, live streaming) is increasingly popular. When viewing videos on a video sharing website, users usually express personal opinions by using bullet-screen comments, or view bullet-screen comments sent by other users, to increase interest in viewing the videos. A display effect of the bullet-screen comment directly affects user experience.

SUMMARY

This application is intended to provide a bullet-screen comment display method and apparatus, a computer device, and a storage medium.

According to an aspect of embodiments of this application, a bullet-screen comment display method is provided. The method includes: obtaining a to-be-displayed bullet-screen comment; placing the to-be-displayed bullet-screen comment into a target bullet-screen comment track at a target bullet-screen comment layer when the to-be-displayed bullet-screen comment meets a preset placement condition, where the target bullet-screen comment layer is one of several bullet-screen comment layers, and the target bullet-screen comment track is one of bullet-screen comment tracks at the target bullet-screen comment layer; and displaying the to-be-displayed bullet-screen comment in the target bullet-screen comment track based on a bullet-screen comment configuration, where the bullet-screen comment configuration includes at least a preset angle between a moving direction of the to-be-displayed bullet-screen comment and a horizontal direction or a vertical direction.

Optionally, the bullet-screen comment configuration further includes a bullet-screen comment moving speed, bullet-screen comment transparency, and a bullet-screen comment font size.

Optionally, bullet-screen comment configurations at different bullet-screen comment layers are at least partially different, and the displaying the to-be-displayed bullet-screen comment in the target bullet-screen comment track based on a bullet-screen comment configuration includes: displaying the to-be-displayed bullet-screen comment in the target bullet-screen comment track based on a bullet-screen comment configuration at the target bullet-screen comment layer.

Optionally, before the obtaining a to-be-displayed bullet-screen comment, the method further includes: determining a bullet-screen comment track width at each bullet-screen comment layer based on the preset angle, and determining start coordinates of each bullet-screen comment track based on the bullet-screen comment track width; and the placing the to-be-displayed bullet-screen comment into a target bullet-screen comment track at a target bullet-screen comment layer includes: placing the to-be-displayed bullet-screen comment into the target bullet-screen comment track based on start coordinates of the target bullet-screen comment track.

Optionally, the determining a bullet-screen comment track width at each bullet-screen comment layer based on the preset angle, and determining start coordinates of each bullet-screen comment track based on the bullet-screen comment track width includes: determining a minimum bullet-screen comment track width at each bullet-screen comment layer based on the preset angle; obtaining a quantity of bullet-screen comment tracks at the bullet-screen comment layer and a size of a bullet-screen comment display area, and determining a target bullet-screen comment track width based on the quantity of bullet-screen comment tracks and the size of the bullet-screen comment display area; and determining the start coordinates of each bullet-screen comment track based on the target bullet-screen comment track width when the target bullet-screen comment track width is greater than the minimum bullet-screen comment track width.

Optionally, the method further includes: determining the start coordinates of each bullet-screen comment track based on the minimum bullet-screen comment track width when the target bullet-screen comment track width is less than or equal to the minimum bullet-screen comment track width.

Optionally, the placing the to-be-displayed bullet-screen comment into the target bullet-screen comment track based on start coordinates of the target bullet-screen comment track includes: determining remaining space of the target bullet-screen comment track based on the minimum bullet-screen comment track width; determining bullet-screen comment start coordinates of the to-be-displayed bullet-screen comment based on the remaining space and the start coordinates; and placing the to-be-displayed bullet-screen comment into the target bullet-screen comment track based on the bullet-screen comment start coordinates.

Optionally, the determining a minimum bullet-screen comment track width at each bullet-screen comment layer based on the preset angle includes: determining a maximum size of a bullet-screen comment and the size of the bullet-screen comment display area, and determining the minimum bullet-screen comment track width based on the preset angle, the maximum size of the bullet-screen comment, and the size of the bullet-screen comment display area.

Optionally, the preset placement condition includes that there is an empty bullet-screen comment track or a target distance is not less than a minimum entry distance, and the target distance is a distance between the last bullet-screen comment in the bullet-screen comment track and a bullet-screen comment start location.

Optionally, before the placing the to-be-displayed bullet-screen comment into a target bullet-screen comment track at a target bullet-screen comment layer, the method further includes: when a plurality of bullet-screen comment tracks at the target bullet-screen comment layer meet that the target distance is not less than the minimum distance, determining that a bullet-screen comment track with a longest target distance is the target bullet-screen comment track.

According to an aspect of embodiments of this application, a bullet-screen comment display apparatus is further provided, and includes: an obtaining means, configured to obtain a to-be-displayed bullet-screen comment; a placement means, configured to place the to-be-displayed bullet-screen comment into a target bullet-screen comment track at a target bullet-screen comment layer when the to-be-displayed bullet-screen comment meets a preset placement condition, where the target bullet-screen comment layer is one of several bullet-screen comment layers, and the target bullet-screen comment track is one of bullet-screen comment tracks at the target bullet-screen comment layer; and a display means, configured to display the to-be-displayed bullet-screen comment in the target bullet-screen comment track based on a bullet-screen comment configuration, where the bullet-screen comment configuration includes at least a preset angle between a moving direction of the to-be-displayed bullet-screen comment and a horizontal direction or a vertical direction.

According to an aspect of embodiments of this application, a computer device is further provided. The computer device includes a memory, a processor, and a computer program stored in the memory and capable of running on the processor. The processor is configured to implement the steps of the bullet-screen comment display method when executing the computer program.

According to an aspect of embodiments of this application, a computer-readable storage medium is further provided. The computer-readable storage medium stores a computer program, and the computer program may be executed by at least one processor, to enable the at least one processor to perform the steps of the bullet-screen comment display method.

DESCRIPTION OF EMBODIMENTS

To make the objectives, technical solutions, and advantages of this application clearer and more comprehensible, the following further describes this application in detail with reference to the accompanying drawings and embodiments. It should be understood that the embodiments described herein are merely used to explain this application but are not intended to limit this application. All other embodiments obtained by a person of ordinary skill in the art based on the embodiments of this application without creative efforts shall fall within the protection scope of this application.

It should be noted that the descriptions such as "first" and "second" in the embodiments of this application are merely used for description, and shall not be understood as an indication or implication of relative importance or an implicit indication of a quantity of indicated technical features. Therefore, a feature limited by "first" or "second" may explicitly or implicitly include at least one feature. In addition, the technical solutions in the embodiments may be combined with each other, provided that a person of ordinary skill in the art can implement the combination. When the combination of the technical solutions is contradictory or cannot be implemented, it should be considered that the combination of the technical solutions does not exist and does not fall within the protection scope of this application.

In the descriptions of this application, it should be understood that numerical symbols before steps do not indicate a sequence of performing the steps, but are merely used to facilitate description of this application and differentiation of each step, and therefore cannot be construed as a limitation on this application.

The following explains terms in this application:

Bullet-screen comment layer: To create a real 3D wishing bullet-screen comment atmosphere, bullet-screen comments are drawn at a plurality of layers. Bullet-screen comments at all layers may have different moving speeds, moving angles, sizes, transparency, or the like.

Figure 1:
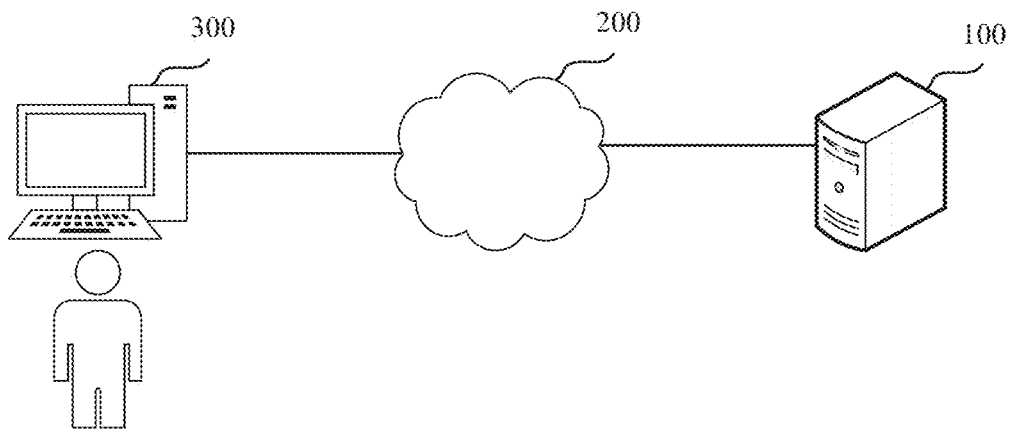
FIG. 1 is a schematic diagram of an environmental architecture according to an embodiment of this application.

FIG. 1 is a schematic diagram of an environmental architecture according to an embodiment of this application.

A client 300 is connected to a server 100 by using a network 200. The client 300 obtains a to-be-displayed bullet-screen comment from the server 100, then determines whether the to-be-displayed bullet-screen comment meets a preset placement condition, when the to-be-displayed bullet-screen comment meets the preset condition, places the to-be-displayed bullet-screen comment into one of bullet-screen comment tracks at one of several bullet-screen comment layers, and then displays the to-be-displayed bullet-screen comment in the bullet-screen comment track based on a bullet-screen comment configuration that includes at least a preset angle between a moving direction of the to-be-displayed bullet-screen comment and a horizontal direction or a vertical direction, so that a 3D spatial effect is presented in bullet-screen comments at a plurality of layers.

In an example embodiment, the server 100 may refer to a data center, for example, a single house, or may be distributed in different geographic locations (for example, in several houses). The server 100 may provide a service by using one or more networks 200.

The network 200 includes various network devices, for example, a router, a switch, a multiplexer, a hub, a modem, a bridge, a repeater, a firewall, and/or a proxy device. The network 200 may include a physical link, for example, a coaxial cable link, a twisted-pair cable link, an optical fiber link, and/or a combination thereof. The network 200 may include a wireless link, for example, a cellular link, a satellite link, and/or a Wi-Fi link.

The client 300 may include, for example, a mobile device, a tablet device, a laptop computer, a smart device (for example, smart clothing, a smartwatch, or smart glasses), a virtual reality headset, a game device, a set-top box, a digital stream device, a robot, a vehicle-mounted terminal, a smart television, a TV box, or an ebook reader.

In a related technology, bullet-screen comments are single-layer bullet-screen comments, and most of the bullet-screen comments move in a horizontal or vertical direction. Therefore, a 3D spatial effect cannot be presented in the bullet-screen comment.

As mentioned above, the display effect of the bullet-screen comment directly affects user experience. Therefore, how to improve the display effect of the bullet-screen comment becomes a key problem. Currently, most of existing bullet-screen comments are single-layer bullet-screen comments, and most of the bullet-screen comments move in a horizontal or vertical direction. Therefore, a 3D spatial effect cannot be presented in the bullet-screen comment.

To resolve a technical problem that a 3D spatial effect cannot be presented in a bullet-screen comment, the bullet-screen comment display method is provided in the embodiments of this application, wherein a 3D spatial effect can be presented in a bullet-screen comment. This enriches a presentation form of the bullet-screen comment, and improves user experience.

The following describes a bullet-screen comment display solution by using several embodiments. For ease of understanding, the following provides descriptions by using an example in which the client 300 in FIG. 1 is used as an execution body.

Figure 2:
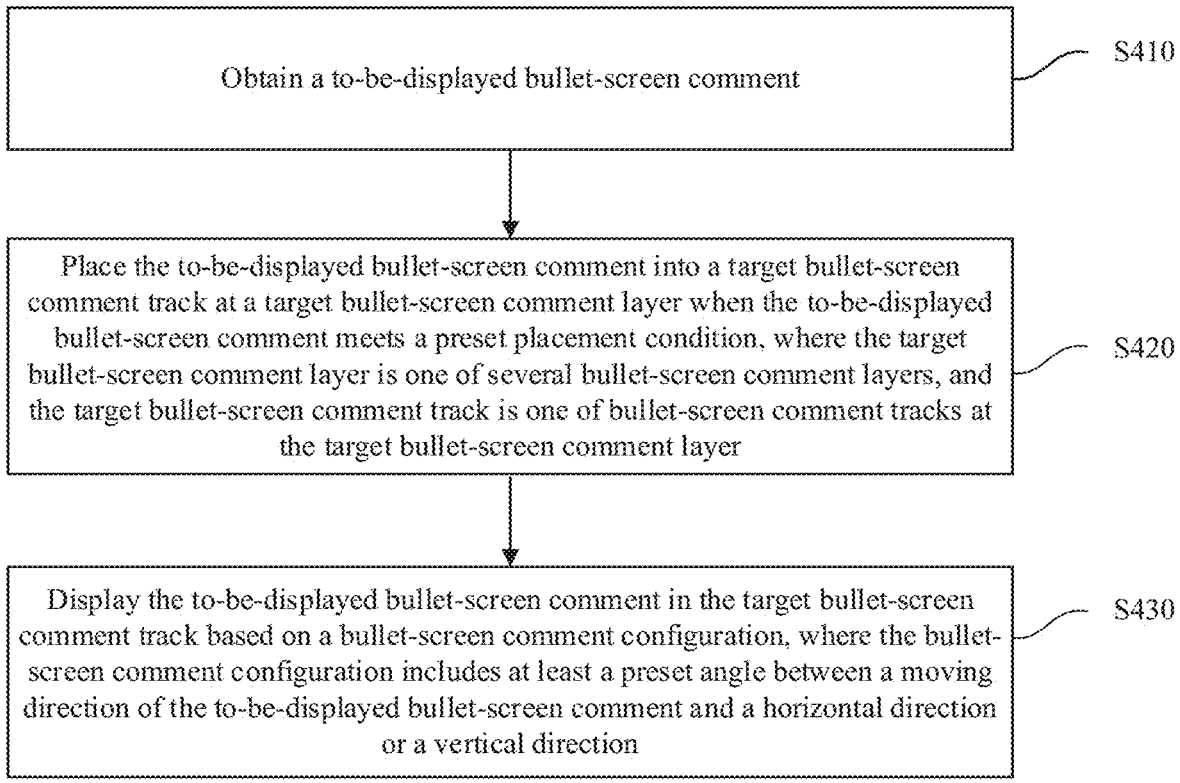
FIG. 2 is a schematic flowchart of a bullet-screen comment display method according to an embodiment of this application.

FIG. 2 is a schematic flowchart of a bullet-screen comment display method according to an embodiment of this application. The method may include step S410 to step S430. Descriptions are as follows:

Step S410: Obtain a to-be-displayed bullet-screen comment.

Step S420: Place the to-be-displayed bullet-screen comment into a target bullet-screen comment track at a target bullet-screen comment layer when the to-be-displayed bullet-screen comment meets a preset placement condition, where the target bullet-screen comment layer is one of several bullet-screen comment layers, and the target bullet-screen comment track is one of bullet-screen comment tracks at the target bullet-screen comment layer.

The preset placement condition may be set based on an actual requirement. This is not limited herein. For example, there is an empty bullet-screen comment track at a current bullet-screen comment layer, and there is enough space in the bullet-screen comment track. A quantity of bullet-screen comment layers and a quantity of bullet-screen comment tracks may also be set based on an actual requirement. This is not limited herein either. For example, three bullet-screen comment layers may be disposed, there are two tracks at the first layer, three tracks at the second layer, and six tracks at the third layer.

Optionally, the to-be-displayed bullet-screen comment may be separately obtained at each bullet-screen comment layer, then the to-be-displayed bullet-screen comment is determined at the current bullet-screen comment layer, and when the to-be-displayed bullet-screen comment meets the preset placement condition, the to-be-displayed bullet-screen comment is placed into a bullet-screen comment track at the current bullet-screen comment layer. Certainly, the bullet-screen comment may be placed in another manner. Optionally, how to place the bullet-screen comment may be set based on an actual requirement. This is not limited herein.

Step S430: Display the to-be-displayed bullet-screen comment in the target bullet-screen comment track based on a bullet-screen comment configuration, where the bullet-screen comment configuration includes at least a preset angle between a moving direction of the to-be-displayed bullet-screen comment and a horizontal direction or a vertical direction.

The preset angle may be set based on an actual requirement. For example, there is a 20-degree angle between the moving direction of the to-be-displayed bullet-screen comment and the vertical direction. This is not limited herein. Optionally, the bullet-screen comment configuration may further include another configuration, for example, a configuration such as transparency. This is not limited herein.

In an example embodiment, the bullet-screen comment configuration may further include but is not limited to a bullet-screen comment moving speed, bullet-screen comment transparency, and a bullet-screen comment font size. It may be understood that a moving speed, transparency, and a font size of the to-be-displayed bullet-screen comment are configured, so that a presentation form of the to-be-displayed bullet-screen comment can be further enriched, and user experience can be improved.

According to the bullet-screen comment display method in this embodiment of this application, the to-be-displayed bullet-screen comment is obtained, when the to-be-displayed bullet-screen comment meets the preset placement condition, the to-be-displayed bullet-screen comment is placed into the target bullet-screen comment track at the target bullet-screen comment laver, and the to-be-displayed bullet-screen comment is displayed in the target bullet-screen comment track based on the bullet-screen comment configuration. Bullet-screen comments are placed at a plurality of bullet-screen comment layers, and when the bullet-screen comment moves, there is the preset angle between a moving direction and the horizontal direction or the vertical direction. Therefore, a 3D spatial effect can be presented in the bullet-screen comment. This enriches a presentation form of the bullet-screen comment, and improves user experience.

In an example embodiment, bullet-screen comment configurations at different bullet-screen comment layers are at least partially different, and in step S430, the displaying the to-be-displayed bullet-screen comment in the target bullet-screen comment track based on a bullet-screen comment configuration may include: displaying the to-be-displayed bullet-screen comment in the target bullet-screen comment track based on a bullet-screen comment configuration at the target bullet-screen comment layer.

That is, when displaying the to-be-displayed bullet-screen comment, the client 300 displays the to-be-displayed bullet-screen comment based on a bullet-screen comment configuration at a bullet-screen comment layer (the target bullet-screen comment layer) corresponding to the to-be-displayed bullet-screen comment. For example, if bullet-screen comment transparency in the bullet-screen comment configuration at the target bullet-screen comment layer is 50%, the transparency of the to-be-displayed bullet-screen comment is set to 50% for display.

It may be understood that from a perspective of a 3D visual effect, different bullet-screen comment layers correspond to different bullet-screen comment configurations, so that a better 3D spatial effect is presented during bullet-screen comment display. For example, in terms of a visual effect, a bullet-screen comment at a "longer distance" should look smaller. Therefore, font sizes at different bullet-screen comment layers are set in descending order, so that an effect presented during bullet-screen comment display is more similar to a real 3D spatial effect. Therefore, bullet-screen comment configurations at different bullet-screen comment layers may be completely different.

Figure 3:
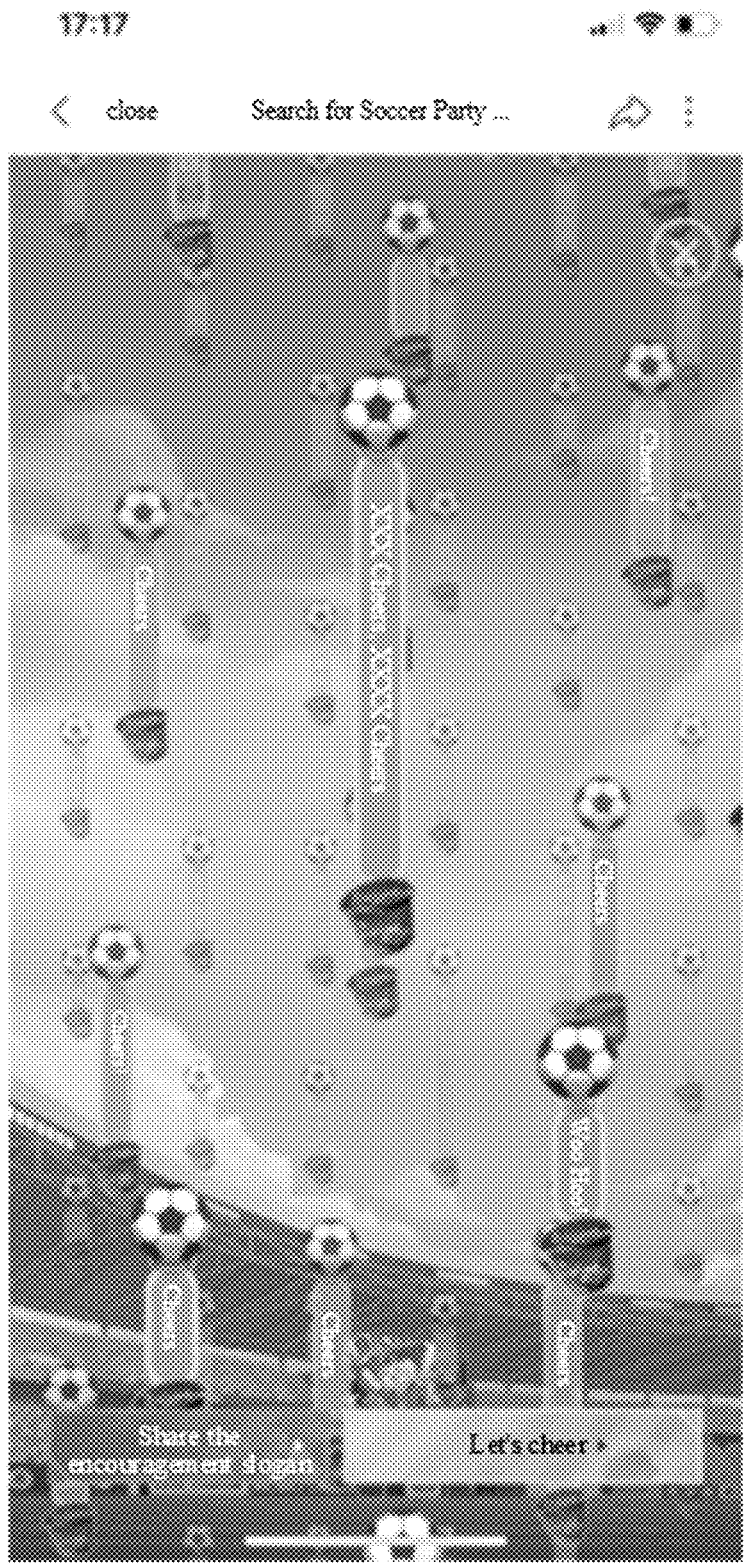
FIG. 3 is an example diagram of bullet-screen comment display.

FIG. 3 is an example diagram of bullet-screen comment display. As shown in the figure, a bullet-screen comment is a wishing bullet-screen comment, and different bullet-screen comment configurations such as different font sizes and transparency may be set for different bullet-screen comment layers, so that a better 3D spatial effect is presented during bullet-screen comment display.

In this embodiment, bullet-screen comment configurations at different bullet-screen comment layers are at least partially different, and when the to-be-displayed bullet-screen comment is displayed in the target bullet-screen comment track based on the bullet-screen comment configuration at the target bullet-screen comment layer, bullet-screen comments at different bullet-screen comment layers may be displayed by using different bullet-screen comment configurations, so that a 3D spatial effect is presented during bullet-screen comment display.

In an example embodiment, before step S410, that is, before the to-be-displayed bullet-screen comment is obtained, the method may further include: determining a bullet-screen comment track width at each bullet-screen comment layer based on the preset angle, and determining start coordinates of each bullet-screen comment track based on the bullet-screen comment track width. Correspondingly, in step S420, the placing the to-be-displayed bullet-screen comment into a target bullet-screen comment track at a target bullet-screen comment track includes: placing the to-be-displayed bullet-screen comment into the target bullet-screen comment track based on start coordinates of the target bullet-screen comment track.

It may be understood that when a bullet-screen comment in each bullet-screen comment track moves at the preset angle, a bullet-screen comment in a bullet-screen comment track may move to another bullet-screen comment track, and overlap a bullet-screen comment in the another bullet-screen comment track. Therefore, the bullet-screen comment track width at the bullet-screen comment layer is determined based on the preset angle, the start coordinates of each bullet-screen comment track are determined based on the bullet-screen comment track width, and then the to-be-displayed bullet-screen comment is placed into the target bullet-screen comment track based on start coordinates of the target bullet-screen comment track. This can reduce a case in which a bullet-screen comment in a bullet-screen comment track moves to another bullet-screen comment track, to further improve an effect presented during bullet-screen comment display.

Figure 4:
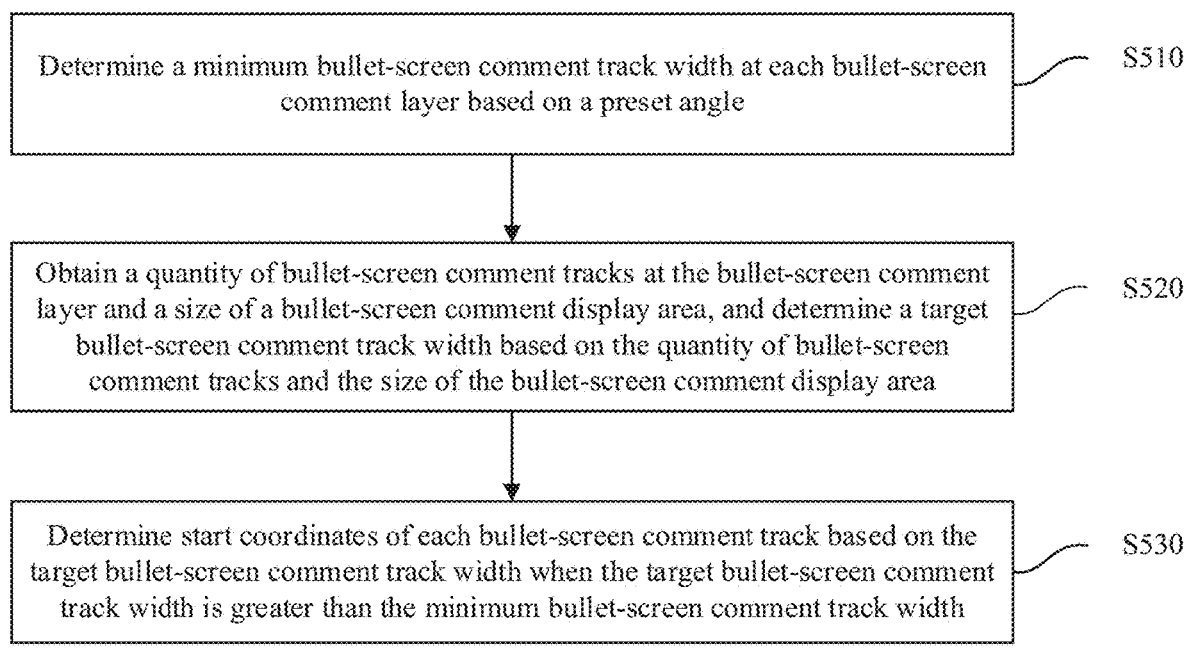
FIG. 4 is a flowchart of determining start coordinates of a bullet-screen comment track in a bullet-screen comment display method.

In an example embodiment, the determining a bullet-screen comment track width at each bullet-screen comment layer based on the preset angle, and determining start coordinates of each bullet-screen comment track based on the bullet-screen comment track width may include step S510 to step S530, as shown in FIG. 4. Details are as follows:

Step S510: Determine a minimum bullet-screen comment track width at each bullet-screen comment layer based on the preset angle.

When the minimum bullet-screen comment track width at each bullet-screen comment layer is determined, the minimum bullet-screen comment track width may be determined based on a moving track starting from initial coordinates of a bullet-screen comment track and finally moving out of a bullet-screen comment display area at the preset angle by the bullet-screen comment.

In an example embodiment, step S510 may further include: determining a maximum size of a bullet-screen comment and a size of the bullet-screen comment display area; and determining the minimum bullet-screen comment track width based on the preset angle, the maximum size of the bullet-screen comment, and the size of the bullet-screen comment display area.

A size of the bullet-screen comment includes sizes in two directions: a size in a word arrangement direction of the bullet-screen comment, for example, a vertical direction or a horizontal direction, and a size in a direction perpendicular to the word arrangement direction. The maximum size of the bullet-screen comment corresponds to a maximum size in the word arrangement direction, and may be determined based on a maximum input length based on a bullet-screen comment limitation. For example, if the bullet-screen comment limitation is that a maximum of 15 words can be entered, the maximum size in the word arrangement direction is a size corresponding to a case in which 15 words are entered. In this case, a corresponding size of the bullet-screen comment is the maximum size of the bullet-screen comment. Correspondingly, the size in the direction perpendicular to the word arrangement direction is a height or a width corresponding to one word. A bullet-screen comment moving from bottom to top is used as an example, the word arrangement direction is the vertical direction, and the direction perpendicular to the word arrangement direction is the horizontal direction, which corresponds to a width of one word.

Figure 5:
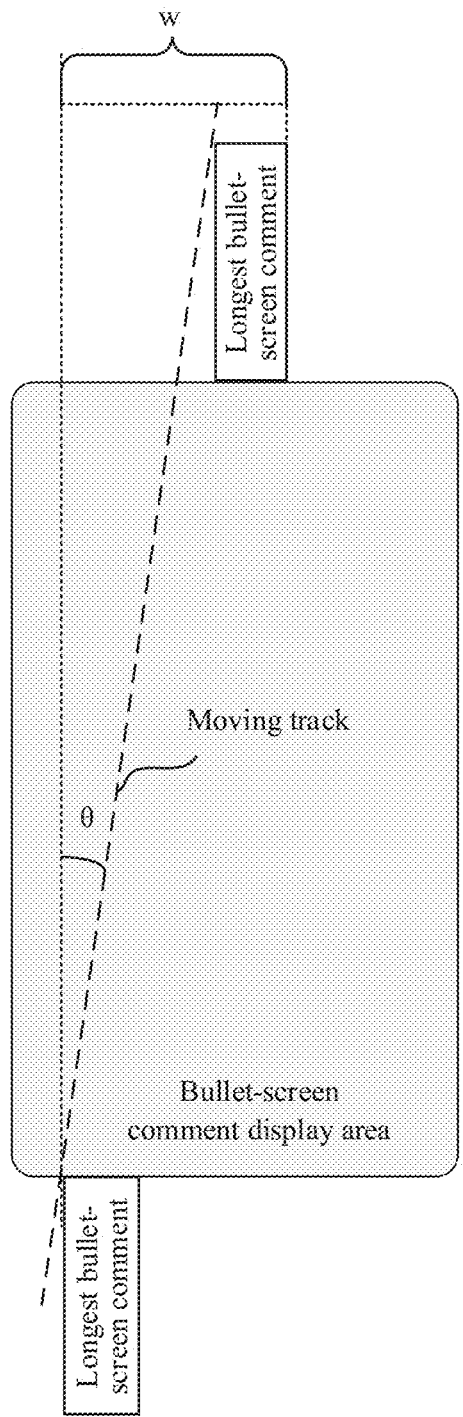
FIG. 5 is a schematic diagram of a principle of determining a minimum bullet-screen comment track width.

FIG. 5 is a schematic diagram of a principle of determining the minimum bullet-screen comment track width. As shown in the figure, the preset angle is $\theta$, and the longest bullet-screen comment starts from the initial coordinates (the leftmost) of the bullet-screen comment track, and finally moves out of the bullet-screen comment display area. In this case, "the minimum bullet-screen comment track width=(a maximum height of the bullet-screen comment+a height of the bullet-screen comment display area)*tan $\theta$+a width of the bullet-screen comment", where the width of the bullet-screen comment is determined based on a width of a word, and is a fixed value.

It may be understood that FIG. 5 shows a case in which the bullet-screen comment moves from bottom to top. If the bullet-screen comment moves in a left-right direction, "the minimum bullet-screen comment track width=(a maximum height of the bullet-screen comment+a width of the bullet-screen comment display area)*tan $\theta$+a width of the bullet-screen comment". That is, in the equation, the height of the bullet-screen comment display area is replaced with the width of the bullet-screen comment display area. In addition, when the minimum bullet-screen comment track width is determined, a height or a width in the size of the bullet-screen comment display area is used.

In this embodiment, the maximum size of the bullet-screen comment and the size of the bullet-screen comment display area are determined, and the minimum bullet-screen comment track width is determined based on the preset angle, the maximum size of the bullet-screen comment, and the size of the bullet-screen comment display area, so that when the bullet-screen comment moves at the preset angle, a critical condition that bullet-screen comments at a same bullet-screen comment layer do not overlap may be determined.

Step S520: Obtain a quantity of bullet-screen comment tracks at the bullet-screen comment layer and a size of a bullet-screen comment display area, and determine a target bullet-screen comment track width based on the quantity of bullet-screen comment tracks and the size of the bullet-screen comment display area.

The quantity of bullet-screen comment tracks at each bullet-screen comment layer may be preset. For example, there are two tracks at the first layer, three tracks at the second layer, and six tracks at the third layer.

After the quantity of bullet-screen comment tracks at each bullet-screen comment layer and the size of the bullet-screen comment display area are obtained, the target bullet-screen comment track width may be determined based on "the target bullet-screen comment track width=the width (or the height) of the bullet-screen comment display area/the quantity of bullet-screen comment tracks".

Step S530: Determine the start coordinates of each bullet-screen comment track based on the target bullet-screen comment track width when the target bullet-screen comment track width is greater than the minimum bullet-screen comment track width.

When the target bullet-screen comment track width is greater than the minimum bullet-screen comment track width, it indicates that when the bullet-screen comment track is obtained through division based on the target bullet-screen comment track width, it can be ensured that the bullet-screen comment has enough display space and does not move to another bullet-screen comment track. Therefore, the bullet-screen comment track may be obtained through division based on the target bullet-screen comment track width, and then the start coordinates of each bullet-screen comment track are determined based on this.

Figure 6:
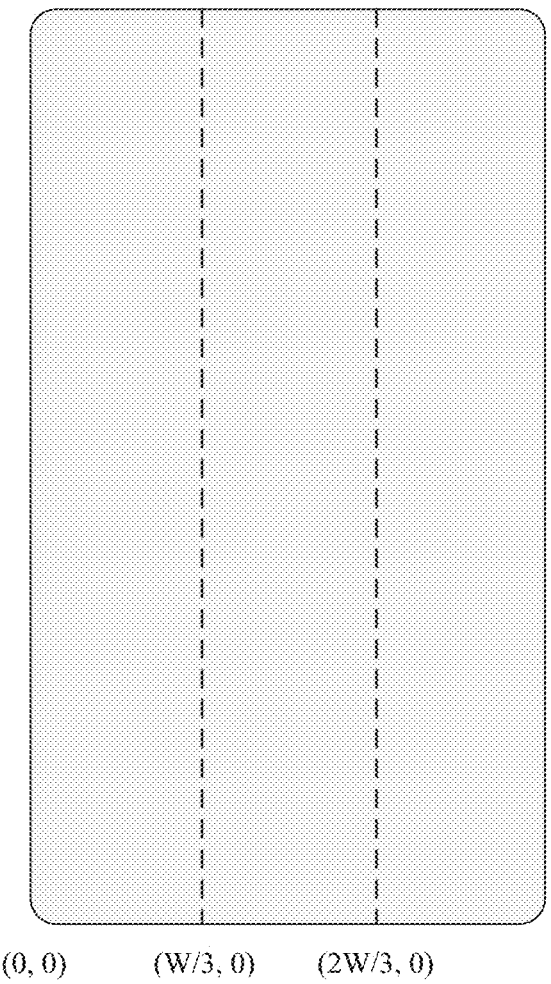
FIG. 6 is an example diagram of determining start coordinates of a bullet-screen comment track based on a target bullet-screen comment track width.

FIG. 6 is an example diagram of determining the start coordinates of the bullet-screen comment track based on the target bullet-screen comment track width. As shown in the figure, when the target bullet-screen comment track width is greater than the minimum bullet-screen comment track width, the bullet-screen comment display area may be directly divided into three bullet-screen comment tracks based on the target bullet-screen comment track width, and then it is determined, based on this, that start coordinates of all the bullet-screen comment tracks are respectively (0, 0), (W/3, 0), and (2W/3, 0), and width ranges of all the bullet-screen comment tracks are respectively (0, W/3), (W/3, 2W/3), and (2W/3, W).

In an example embodiment, when the target bullet-screen comment track width is less than or equal to the minimum bullet-screen comment track width, the start coordinates of each bullet-screen comment track are determined based on the minimum bullet-screen comment track width.

Figure 7:
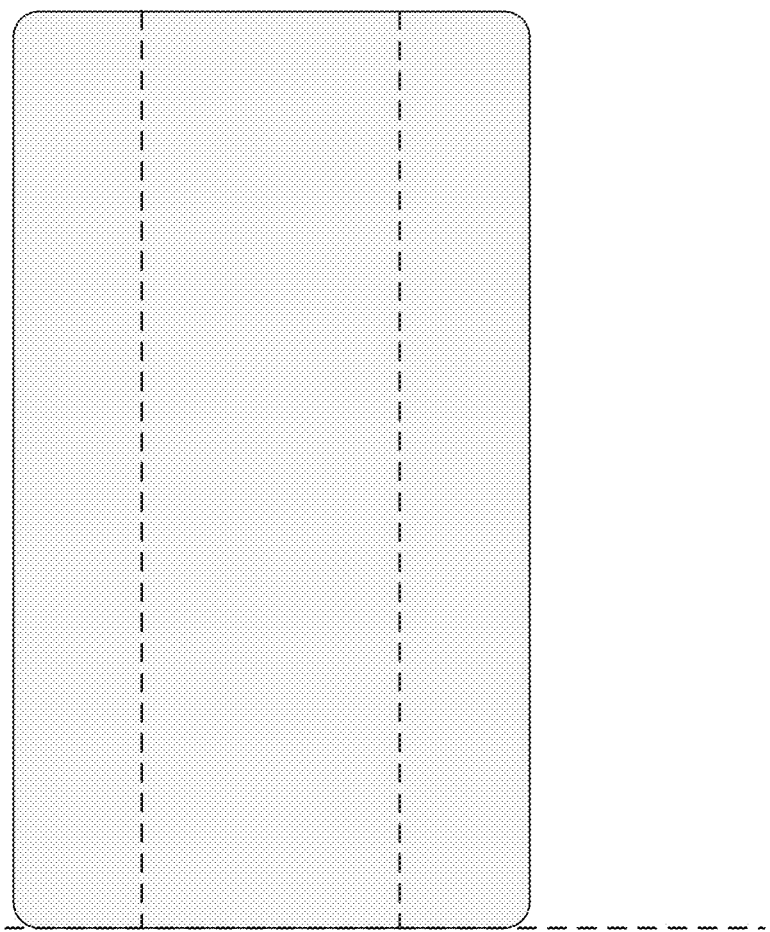
FIG. 7 is an example diagram of determining start coordinates of a bullet-screen comment track based on a minimum bullet-screen comment track width.

FIG. 7 is an example diagram of determining the start coordinates of the bullet-screen comment track based on the minimum bullet-screen comment track width. As shown in the figure, when the target bullet-screen comment track width is less than the minimum bullet-screen comment track width, a width of a bullet-screen comment drawing area may be obtained by multiplying the minimum bullet-screen comment track width by the quantity of bullet-screen comment tracks, and then the start coordinates of each bullet-screen comment track are determined based on the width of the drawing area. In this case, a horizontal coordinate in start coordinates of the first bullet-screen comment track is a negative number (a lower left corner of the bullet-screen comment display area is used as an origin).

In this embodiment, the minimum bullet-screen comment track width at each bullet-screen comment layer is determined based on the preset angle, the quantity of bullet-screen comment tracks at the bullet-screen comment layer and the size of the bullet-screen comment display area are obtained, and the target bullet-screen comment track width is determined based on the quantity of bullet-screen comment tracks and the size of the bullet-screen comment display area, and when the target bullet-screen comment track width is greater than the minimum bullet-screen comment track width, the start coordinates of each bullet-screen comment track are determined based on the target bullet-screen comment track width, so that it can be ensured that when the bullet-screen comment moves at a same bullet-screen comment layer, the bullet-screen comment does not move to another bullet-screen comment track, and overlap another bullet-screen comment, to further improve a space presentation effect of the bullet-screen comment.

Figure 8:
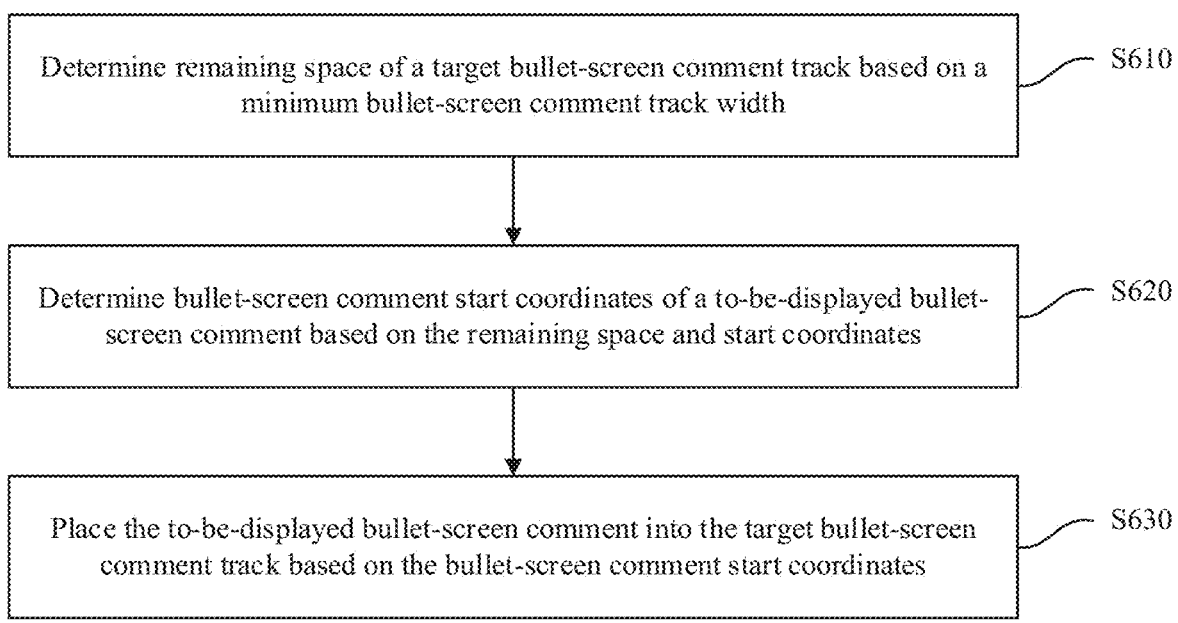
FIG. 8 is a flowchart of placing a to-be-displayed bullet-screen comment into a target bullet-screen comment track in a bullet-screen comment display method.

In an example embodiment, the placing the to-be-displayed bullet-screen comment into the target bullet-screen comment track based on start coordinates of the target bullet-screen comment track may include step S610 to step S630, as shown in FIG. 8. Details are as follows:

Step S610: Determine remaining space of the target bullet-screen comment track based on the minimum bullet-screen comment track width.

Figure 9:
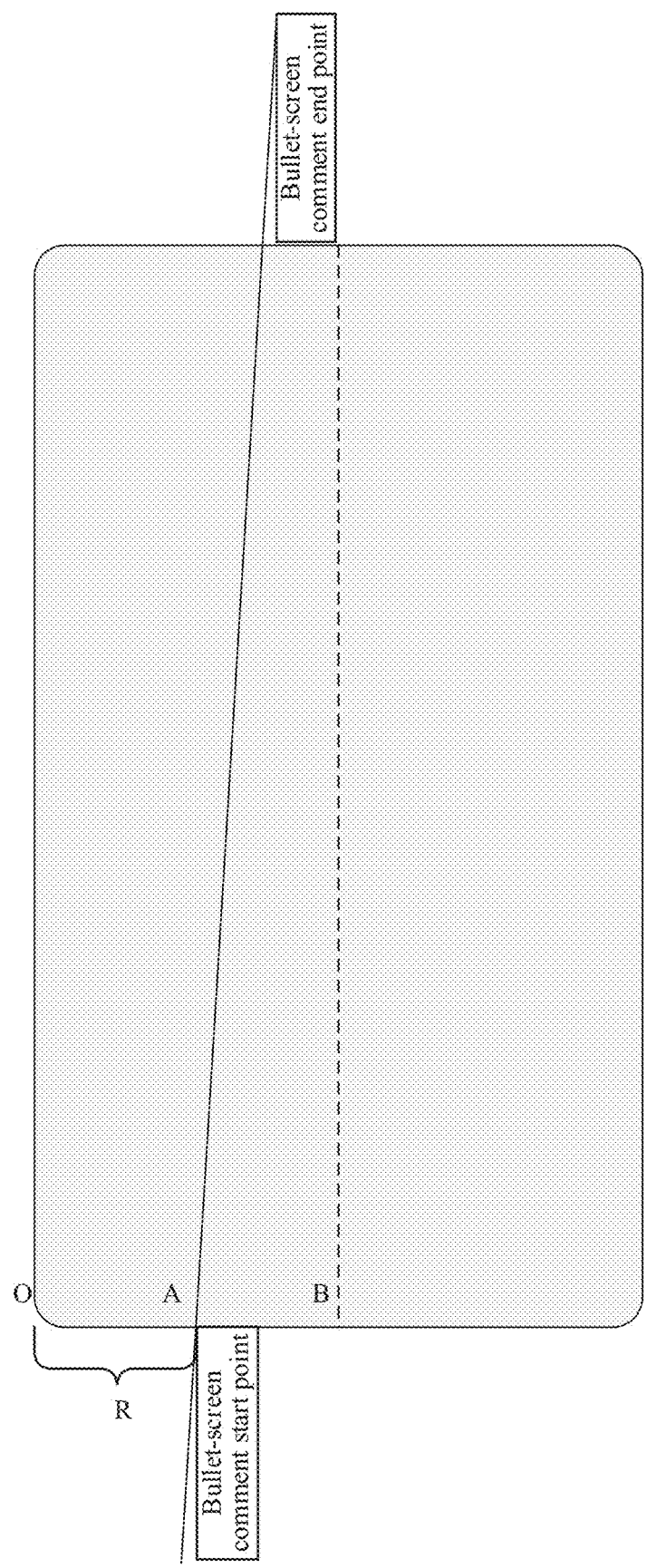
FIG. 9 is a schematic diagram of a principle of determining remaining space of a target bullet-screen comment track.

FIG. 9 is a schematic diagram of a principle of determining the remaining space of the target bullet-screen comment track. As shown in the figure, there are two bullet-screen comment tracks at the current bullet-screen comment layer. When starting from a point A, the bullet-screen comment does not exactly enter a second bullet-screen comment track. Therefore, the bullet-screen comment can start from any point between a point O and the point A. Space corresponding to OA is the remaining space. A distance between the point A and a point B is actually the minimum bullet-screen comment track width. Correspondingly, the remaining space=the bullet-screen comment track width–the minimum bullet-screen comment track width. When the bullet-screen comment track width is equal to the minimum bullet-screen comment track width, the remaining space is 0. The bullet-screen comment does not move to another bullet-screen comment track only when the bullet-screen comment can start from the start coordinates of the bullet-screen comment track.

Step S620: Determine bullet-screen comment start coordinates of the to-be-displayed bullet-screen comment based on the remaining space and the start coordinates.

It may be learned from the example in FIG. 9 that the bullet-screen comment can start from any point between the point O and the point A. Therefore, the bullet-screen comment start coordinates may be coordinates of any point between the point O and the point A, and the bullet-screen comment start coordinates of the to-be-displayed bullet-screen comment may be determined based on "the bullet-screen comment start coordinates=the remaining space*a random number+the start coordinates of the bullet-screen comment track", where a value of the random number ranges from 0 to 1.

Step S630: Place the to-be-displayed bullet-screen comment into the target bullet-screen comment track based on the bullet-screen comment start coordinates.

In this embodiment, the remaining space of the target bullet-screen comment track is determined based on the minimum bullet-screen comment track width, the bullet-screen comment start coordinates of the to-be-displayed bullet-screen comment are determined based on the remaining space and the start coordinates, and the to-be-displayed bullet-screen comment is placed into the target bullet-screen comment track based on the bullet-screen comment start coordinates, so that the bullet-screen comment can start from any point in the remaining space for display. Compared with a manner in which bullet-screen comments start from a same starting point, a better bullet-screen comment presentation effect is achieved, and user experience is further improved.

In an example embodiment, the preset placement condition includes that there is an empty bullet-screen comment track or a target distance is not less than a minimum entry distance, and the target distance is a distance between the last bullet-screen comment in the bullet-screen comment track and a bullet-screen comment start location.

The minimum entry distance may be a preset minimum distance between two bullet-screen comments. The target distance may be determined based on "the target distance= (current time−appearance time of A)*a bullet-screen comment moving speed−a size of A", where A is the last bullet-screen comment, and the size of A may be a height or a width of the bullet-screen comment.

Figure 10A:
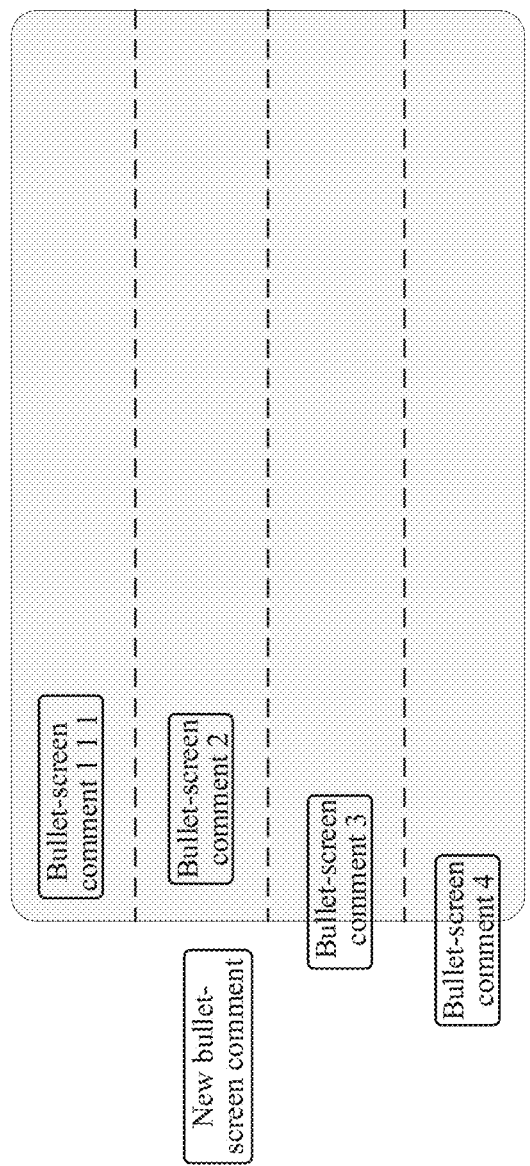
FIGS. 10A-10B are example diagrams of a principle and a procedure of placing a new bullet-screen comment into a bullet-screen comment track.
Figure 10B:
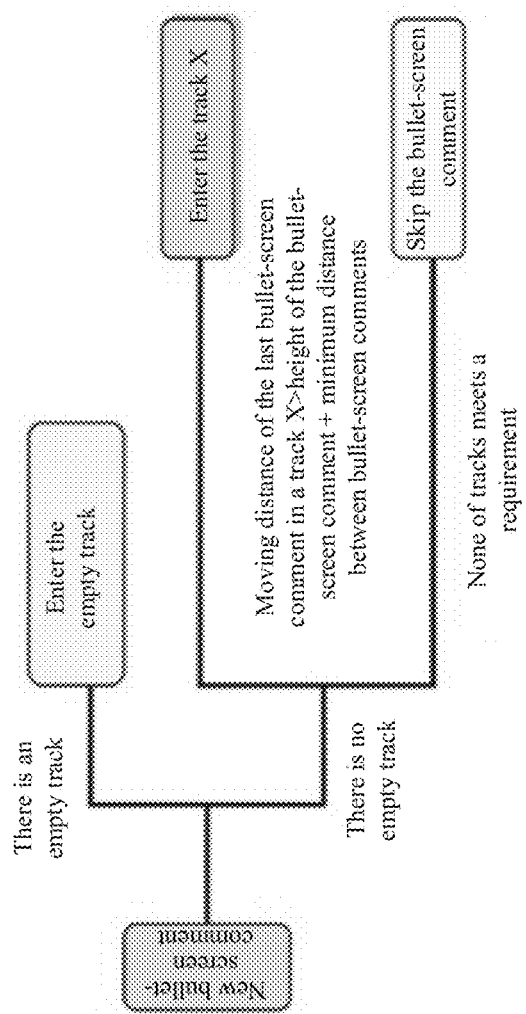

FIGS. 10A-10B are example diagrams of a principle and a procedure of placing a new bullet-screen comment into a bullet-screen comment track. As shown in the figures, if there is an empty bullet-screen comment track at the current bullet-screen comment layer, the bullet-screen comment enters the empty bullet-screen comment track. If there is no empty bullet-screen comment track, it is determined whether a target distance of a bullet-screen comment track X is greater than or equal to the minimum entry distance, or it may be determined whether a condition that "a moving distance of the last bullet-screen comment in a bullet-screen comment track X>a height of the bullet-screen comment+ the minimum distance between bullet-screen comments" in the figure is met. If a bullet-screen comment track meets the condition, the bullet-screen comment is placed into the corresponding bullet-screen comment track. If none of all bullet-screen comment tracks meets the condition, the bullet-screen comment is skipped.

In an example embodiment, when a plurality of bullet-screen comment tracks at the target bullet-screen comment layer meet that the target distance is not less than the minimum distance, it is determined that a bullet-screen comment track with a longest target distance is the target bullet-screen comment track. Certainly, when a plurality of bullet-screen comment tracks at the target bullet-screen comment layer meet that the target distance is not less than the minimum distance, one of the bullet-screen comment tracks that meet the condition may be randomly selected as the target bullet-screen comment track. However, when the bullet-screen comment track with a longest target distance is determined as the target bullet-screen comment track, the bullet-screen comment can be more properly displayed, to help improve a display effect of the bullet-screen comment.

Figure 11A:
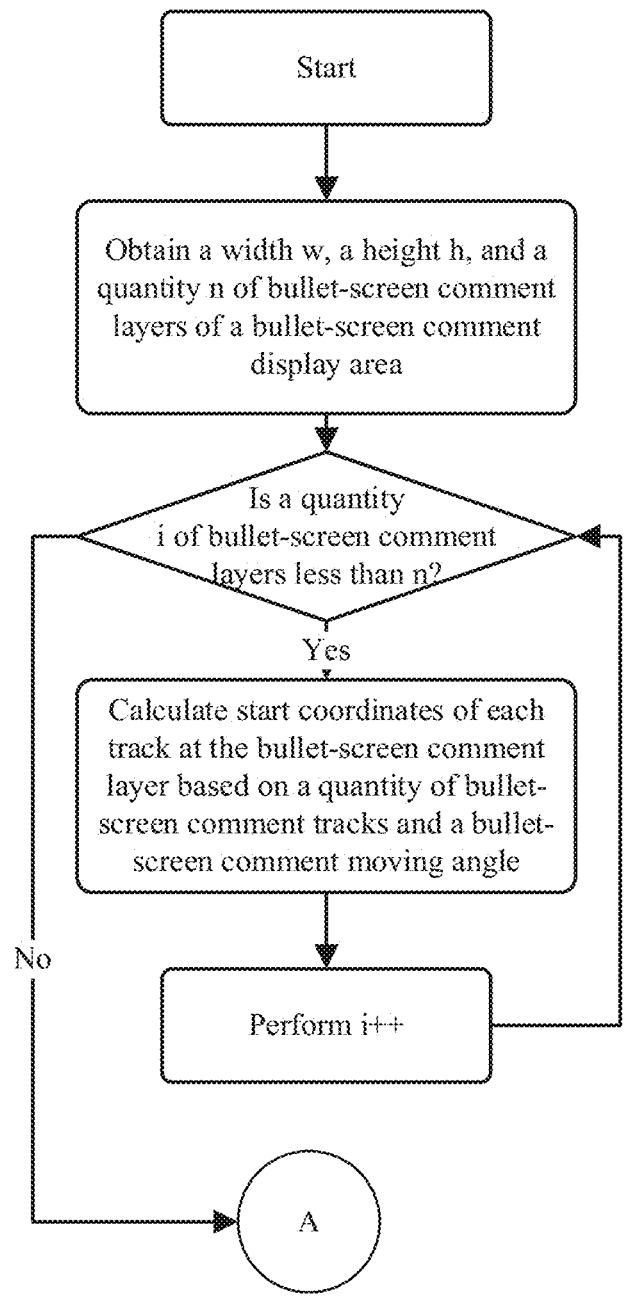
FIGS. 11A-11B are example diagrams of a procedure of drawing a bullet-screen comment at a bullet-screen comment layer.
Figure 11A:
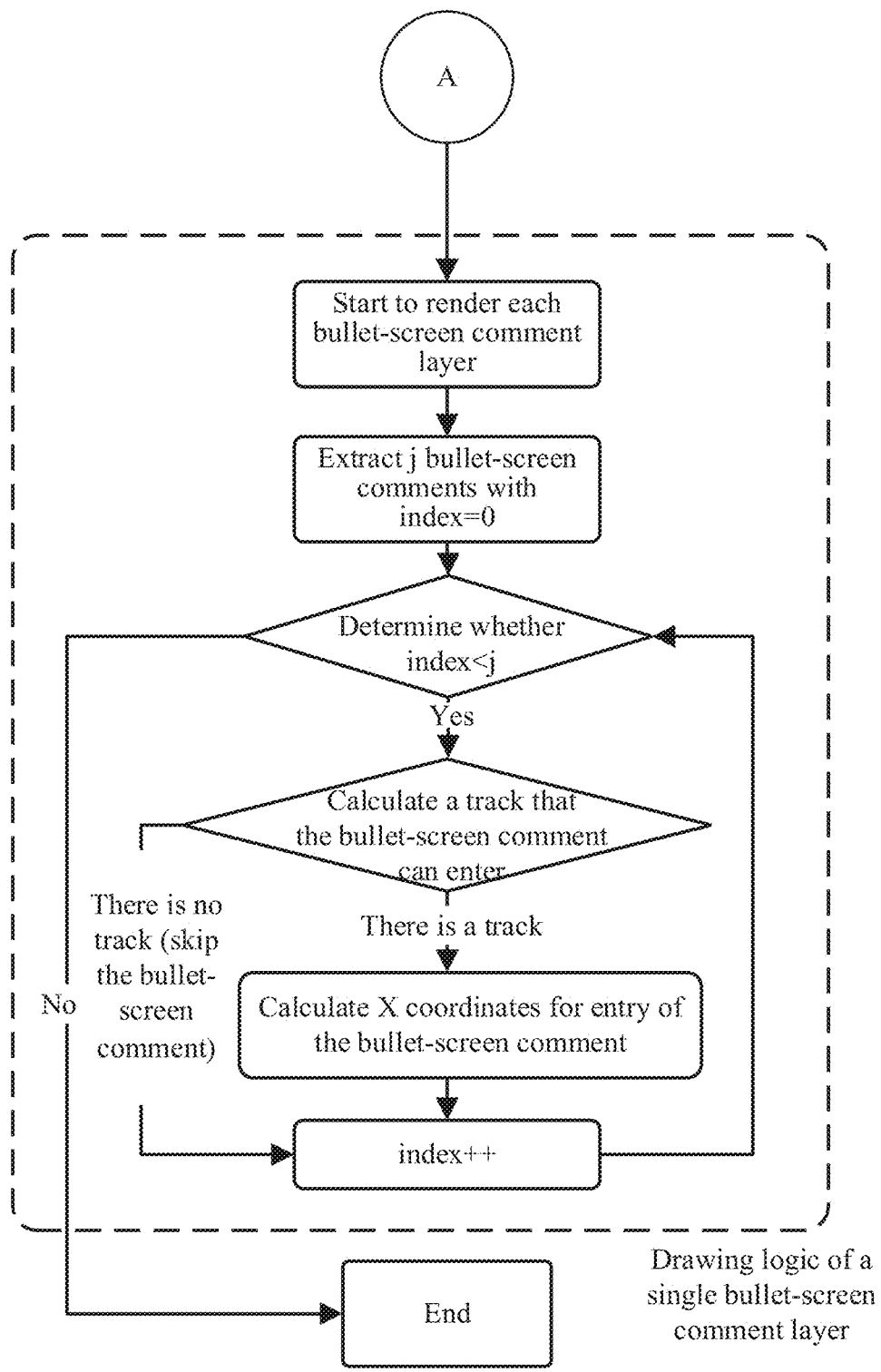

A procedure of drawing a bullet-screen comment at a plurality of bullet-screen comment layers is described below by using an example. As shown in FIG. 11A, the procedure is roughly as follows:

1. Start.
2. Obtain a width w, a height h, and a quantity n of bullet-screen comment layers of the bullet-screen comment display area.
3. Determine whether a quantity i of bullet-screen comment layers is less than n. If the quantity i of bullet-screen comment layers is less than n, 4 is performed. Otherwise, 6 is performed.
4. Calculate start coordinates of each bullet-screen comment track at the bullet-screen comment layer based on a quantity of bullet-screen comment tracks and a bullet-screen comment moving angle (namely, the preset angle).
5. Perform i++, and perform 3 again.
6. Start to render each bullet-screen comment layer.
7. Extract j bullet-screen comments, starting from the first bullet-screen comment with index=0.
8. Determine whether the index is less than j. If the index is less than j, 9 is performed. Otherwise, 12 is performed.
9. Calculate whether the bullet-screen comment can enter a bullet-screen comment track. If the bullet-screen comment can enter a bullet-screen comment track, 10 is performed. Otherwise, the bullet-screen comment is skipped, and 11 is performed.
10. Calculate X coordinates (namely, start coordinates of the bullet-screen comment) for entry of the bullet-screen comment.
11. Perform index++, and perform 8 again.
12. End.

Figure 11B:
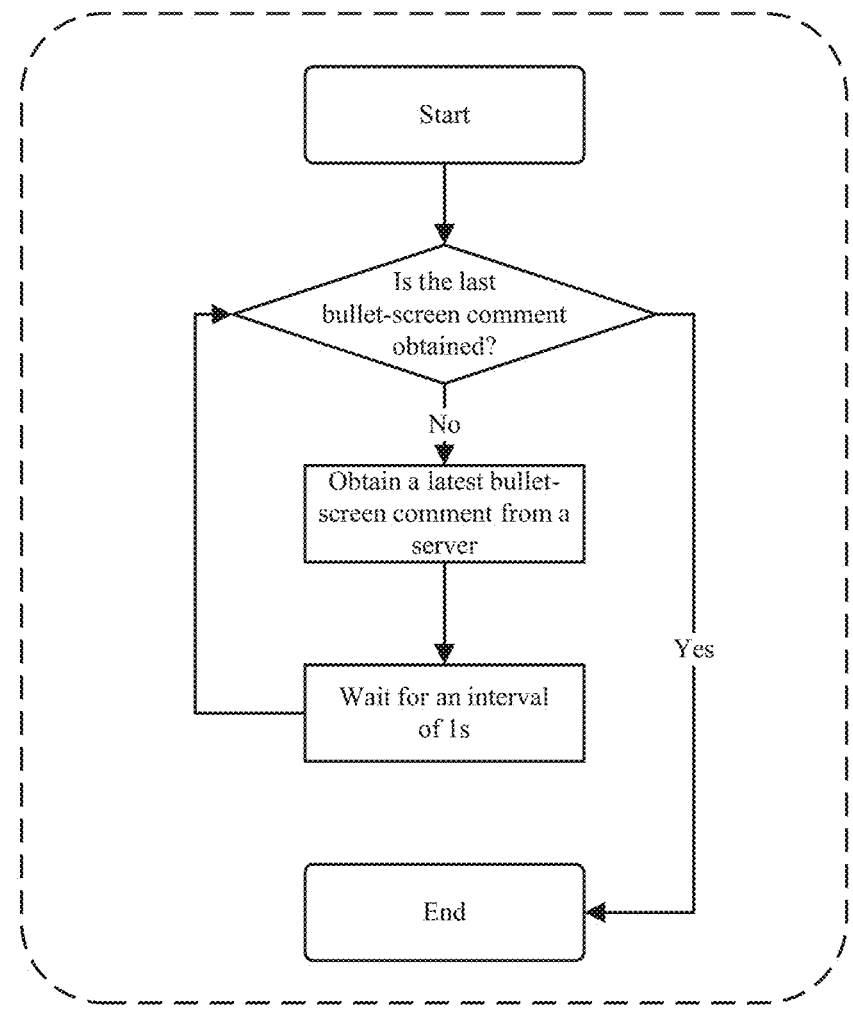

6-11 are a drawing procedure of a single bullet-screen comment layer. After the j bullet-screen comment are extracted, an operation may be performed based on a procedure on a right side of the figure. As shown in FIG. 11B, details are as follows:

1. Start.
2. Determine whether the last bullet-screen comment is obtained. If the last bullet-screen comment is obtained, 5 is performed. Otherwise, 3 is performed.
3. Obtain the latest bullet-screen comment from a server.
4. Wait for an interval of 1s, and perform 2 again.
5. End.

The interval of 1s in 4 is to reduce pressure on the server, and may be set to another number in a unit of second. In the figure, 1s is merely an example.

Figure 12:
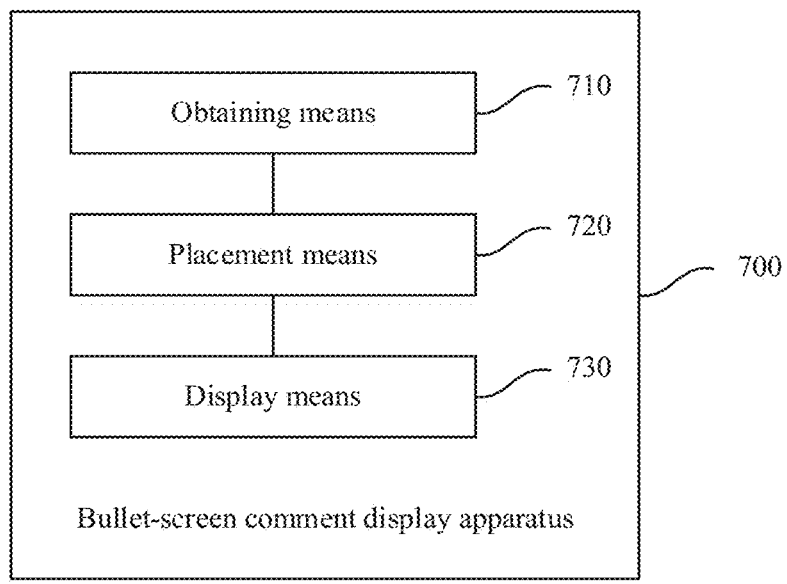
FIG. 12 is a schematic block diagram of a bullet-screen comment display apparatus according to an embodiment of this application.

FIG. 12 is a schematic block diagram of a bullet-screen comment display apparatus 700 according to an embodiment of this application. The bullet-screen comment display apparatus 700 may be divided into one or more program means. The one or more program means are stored in a storage medium and executed by one or more processors, to complete this embodiment of this application. The program means in this embodiment of this application is a series of computer program instruction segments that can be used to complete a specific function. The following describes a function of each program means in this embodiment.

As shown in FIG. 12, the bullet-screen comment display apparatus 700 may include an obtaining means 710, a placement means 720, and a display means 730.

The obtaining means 710 is configured to obtain a to-be-displayed bullet-screen comment.

The placement means 720 is configured to place the to-be-displayed bullet-screen comment into a target bullet-screen comment track at a target bullet-screen comment layer when the to-be-displayed bullet-screen comment meets a preset placement condition. The target bullet-screen comment layer is one of several bullet-screen comment layers, and the target bullet-screen comment track is one of bullet-screen comment tracks at the target bullet-screen comment layer.

The display means 730 is configured to display the to-be-displayed bullet-screen comment in the target bullet-screen comment track based on a bullet-screen comment configuration. The bullet-screen comment configuration includes at least a preset angle between a moving direction of the to-be-displayed bullet-screen comment and a horizontal direction or a vertical direction.

In an example embodiment, the bullet-screen comment configuration further includes a bullet-screen comment moving speed, bullet-screen comment transparency, and a bullet-screen comment font size.

In an example embodiment, bullet-screen comment configurations at different bullet-screen comment layers are at least partially different, and the display means 730 is further configured to display the to-be-displayed bullet-screen comment in the target bullet-screen comment track based on a bullet-screen comment configuration at the target bullet-screen comment layer.

In an example embodiment, the placement means 720 is further configured to: determine a bullet-screen comment track width at each bullet-screen comment layer based on the preset angle, and determine start coordinates of each bullet-screen comment track based on the bullet-screen comment track width; and place the to-be-displayed bullet-screen comment into the target bullet-screen comment track based on start coordinates of the target bullet-screen comment track.

In an example embodiment, the placement means 720 is further configured to: determine a minimum bullet-screen comment track width at each bullet-screen comment layer based on the preset angle, obtain a quantity of bullet-screen comment tracks at the bullet-screen comment layer and a size of a bullet-screen comment display area, and determine a target bullet-screen comment track width based on the quantity of bullet-screen comment tracks and the size of the bullet-screen comment display area; and determine the start coordinates of each bullet-screen comment track based on the target bullet-screen comment track width when the target bullet-screen comment track width is greater than the minimum bullet-screen comment track width.

In an example embodiment, the placement means 720 is further configured to determine the start coordinates of each bullet-screen comment track based on the minimum bullet-screen comment track width when the target bullet-screen comment track width is less than or equal to the minimum bullet-screen comment track width.

In an example embodiment, the placement means 720 is further configured to: determine remaining space of the target bullet-screen comment track based on the minimum bullet-screen comment track width; determine bullet-screen comment start coordinates of the to-be-displayed bullet-screen comment based on the remaining space and the start coordinates; and place the to-be-displayed bullet-screen comment into the target bullet-screen comment track based on the bullet-screen comment start coordinates.

In an example embodiment, the placement means 720 is further configured to: determine a maximum size of a bullet-screen comment and the size of the bullet-screen comment display area; and determine the minimum bullet-screen comment track width based on the preset angle, the maximum size of the bullet-screen comment, and the size of the bullet-screen comment display area.

In an example embodiment, the preset placement condition includes that there is an empty bullet-screen comment track or a target distance is not less than a minimum entry distance, and the target distance is a distance between the last bullet-screen comment in the bullet-screen comment track and a bullet-screen comment start location.

In an example embodiment, the placement means 720 is further configured to: when a plurality of bullet-screen comment tracks at the target bullet-screen comment layer meet that the target distance is not less than the minimum distance, determine that a bullet-screen comment track with a longest target distance is the target bullet-screen comment track.

Figure 13:
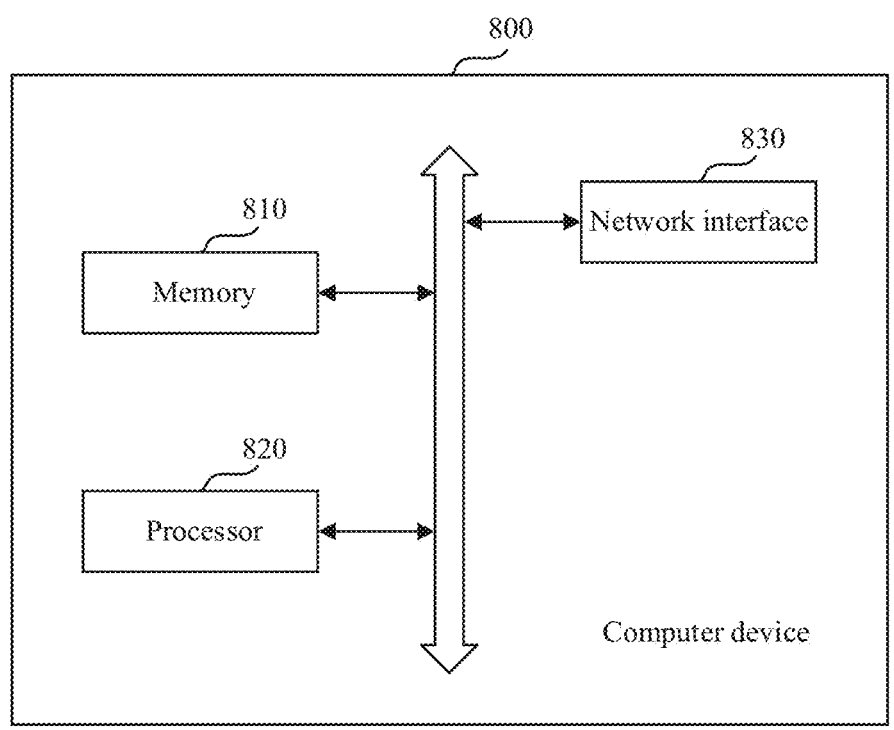
FIG. 13 is a schematic diagram of a hardware architecture of a computer device according to an embodiment of this application.

FIG. 13 is a schematic diagram of a hardware architecture of a computer device 800 applicable to the bullet-screen comment display method according to an embodiment of this application. The computer device 800 may be a device that can automatically calculate a value and/or process data based on instructions that are set or stored in advance. For example, the computer device 800 may be a rack server, a blade server, a tower server, a cabinet server (including an independent server, or a server cluster including a plurality of servers), a gateway, or the like. As shown in FIG. 13, the computer device 800 at least includes but is not limited to a memory 810, a processor 820, and a network interface 830 that can be communicatively connected to each other by using a system bus.

The memory 810 includes at least one type of computer-readable storage medium. The readable storage medium includes a flash memory, a hard disk, a multimedia card, a card-type memory (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, or the like. In some embodiments, the memory 810 may be an internal storage means of the computer device 800, for example, a hard disk or a memory of the computer device 800. In some other embodiments, the memory 810 may alternatively be an external storage device of the computer device 800, for example, a removable hard disk, a smart media card (SMC), a secure digital (SD) card, or a flash card (Flash card) that is disposed on the computer device 800. Certainly, the memory 810 may alternatively include both an internal storage means of the computer device 800 and an external storage device of the computer device 800. In this embodiment, the memory 810 is usually configured to store an operating system and various types of application software that are installed on the computer device 800, for example, program code of the bullet-screen comment display method. In addition, the memory 810 may be further configured to temporarily store various types of data that have been output or are to be output.

The processor 820 may be a central processing unit (CPU), a controller, a microcontroller, a microprocessor, or another data processing chip in some embodiments. The processor 820 is usually configured to control an overall operation of the computer device 800, for example, perform control and processing related to data exchange or communication performed by the computer device 800. In this embodiment, the processor 820 is configured to run program code stored in the memory 810 or process data.

The network interface 830 may include a wireless network interface or a wired network interface, and the network interface 830 is usually configured to establish a communication link between the computer device 800 and another computer device. For example, the network interface 830 is configured to: connect the computer device 800 to an external terminal by using a network, and establish a data transmission channel, a communication link, and the like between the computer device 800 and the external terminal. The network may be a wireless or wired network, for example, an Intranet, the Internet, a global system for mobile communications (GSM), wideband code division multiple access (WCDMA), a 4G network, a 5G network, Bluetooth, or Wi-Fi.

It should be noted that FIG. 13 shows only a computer device that has the component 810 to the component 830. However, it should be understood that implementation of all the shown components is not required, and more or fewer components may alternatively be implemented.

In this embodiment, the bullet-screen comment display method stored in the memory 810 may be further divided into one or more program means to be executed by one or more processors (the processor 820 in this embodiment), to complete this embodiment of this application.

An embodiment of this application further provides a computer-readable storage medium. The computer-readable storage medium stores a computer program. When the computer program is executed by a processor, the steps of the bullet-screen comment display method in the embodiments are implemented.

In this embodiment, the computer-readable storage medium includes a flash memory, a hard disk, a multimedia card, a card-type memory (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, or the like. In some embodiments, the computer-readable storage medium may be an internal storage unit of a computer device, for example, a hard disk or a memory of the computer device. In some other embodiments, the computer-readable storage medium may be an external storage device of the computer device, for example, a removable hard disk, a smart media card (SMC), a secure digital (SD) card, or a flash card that is disposed on the computer device. Certainly, the computer-readable storage medium may alternatively include both an internal storage unit of the computer device and an external storage device of the computer device. In this embodiment, the computer-readable storage medium is usually configured to store an operating system and various types of application software that are installed on the computer device, for example, program code of the bullet-screen comment display method in the embodiments. In addition, the computer-readable storage medium may be further configured to temporarily store various types of data that have been output or are to be output.

Clearly, a person skilled in the art should understand that the foregoing means or steps in the embodiments of this application may be implemented by using a general computing apparatus. The means or steps may be integrated into a single computing apparatus or distributed in a network including a plurality of computing apparatuses. Optionally, the means or steps may be implemented by using program code that can be executed by the computing apparatus. Therefore, the means or steps may be stored in a storage apparatus for execution by the computing apparatus. In addition, in some cases, the shown or described steps may be performed in a sequence different from the sequence herein. Alternatively, the means or steps may be separately made into integrated circuit means, or a plurality of means or steps in the means or steps may be made into a single integrated circuit means for implementation. In this way, a combination of any hardware and software is not limited in the embodiments of this application.

The foregoing descriptions are merely example embodiments of this application, and are not intended to limit the scope of this application. Any equivalent structure or equivalent procedure change made based on the content of this specification and the accompanying drawings of this application is directly or indirectly applied to other related technical fields, and shall fall within the protection scope of this application.

What is claimed is:

1. A method, comprising:
   obtaining a to-be-displayed bullet-screen comment;
   placing the to-be-displayed bullet-screen comment into a target bullet-screen comment track at a target bullet-screen comment layer in response to the to-be-displayed bullet-screen comment meeting a preset placement condition, wherein the target bullet-screen comment layer is one of several bullet-screen comment layers, bullet-screen comment tracks at each bullet-screen comment layer respectively have a same bullet-screen comment track width, and the target bullet-screen comment track is one of bullet-screen comment tracks at the target bullet-screen comment layer; and
   displaying the to-be-displayed bullet-screen comment in the target bullet-screen comment track based on a bullet-screen comment configuration, wherein the bullet-screen comment configuration comprises at least a preset angle between a moving direction of the to-be-displayed bullet-screen comment and a horizontal direction or a vertical direction,
   wherein before the obtaining a to-be-displayed bullet-screen comment, the method further comprises:
   determining a bullet-screen comment track width at each bullet-screen comment layer based on the preset angle, and determining start location coordinates of each bullet-screen comment track based on the bullet-screen comment track width; and
   the placing the to-be-displayed bullet-screen comment into a target bullet-screen comment track at a target bullet-screen comment layer comprises:
   placing the to-be-displayed bullet-screen comment into the target bullet-screen comment track based on start location coordinates of the target bullet-screen comment track.

2. The method according to claim 1, wherein the bullet-screen comment configuration further comprises a bullet-screen comment moving speed, bullet-screen comment transparency, and a bullet-screen comment font size.

3. The method according to claim 2, wherein bullet-screen comment configurations at different bullet-screen comment layers are at least partially different, and the displaying the to-be-displayed bullet-screen comment in the target bullet-screen comment track based on a bullet-screen comment configuration comprises:
   displaying the to-be-displayed bullet-screen comment in the target bullet-screen comment track based on a bullet-screen comment configuration at the target bullet-screen comment layer.

4. The method according to claim 1, wherein the determining a bullet-screen comment track width at each bullet-screen comment layer based on the preset angle, and determining start location coordinates of each bullet-screen comment track based on the bullet-screen comment track width comprises:
   determining a minimum bullet-screen comment track width at each bullet-screen comment layer based on the preset angle;
   obtaining a quantity of bullet-screen comment tracks at the bullet-screen comment layer and a size of a bullet-screen comment display area, and determining a target bullet-screen comment track width based on the quantity of bullet-screen comment tracks and the size of the bullet-screen comment display area; and determining the start location coordinates of each bullet-screen comment track based on the target bullet-screen comment track width in response to the target bullet-screen comment track width being greater than the minimum bullet-screen comment track width.

5. The method according to claim 4, wherein the determining a bullet-screen comment track width at each bullet-screen comment layer based on the preset angle, and determining start location coordinates of each bullet-screen comment track based on the bullet-screen comment track width further comprises:
determining the start location coordinates of each bullet-screen comment track based on the minimum bullet-screen comment track width in response to the target bullet-screen comment track width being less than or equal to the minimum bullet-screen comment track width.

6. The method according to claim 4, wherein the placing the to-be-displayed bullet-screen comment into the target bullet-screen comment track based on start location coordinates of the target bullet-screen comment track comprises:
determining remaining space of the target bullet-screen comment track based on the minimum bullet-screen comment track width;
determining bullet-screen comment start location coordinates of the to-be-displayed bullet-screen comment based on the remaining space and the start location coordinates; and
placing the to-be-displayed bullet-screen comment into the target bullet-screen comment track based on the bullet-screen comment start location coordinates.

7. The method according to claim 4, wherein the determining a minimum bullet-screen comment track width at each bullet-screen comment layer based on the preset angle comprises:
determining a maximum size of a bullet-screen comment and the size of the bullet-screen comment display area; and
determining the minimum bullet-screen comment track width based on the preset angle, the maximum size of the bullet-screen comment, and the size of the bullet-screen comment display area.

8. The method according to claim 1, wherein the preset placement condition comprises that there is an empty bullet-screen comment track or a target distance is not less than a minimum entry distance, and the target distance is a distance between the last bullet-screen comment in the bullet-screen comment track and a bullet-screen comment start location.

9. The method according to claim 8, before the placing the to-be-displayed bullet-screen comment into a target bullet-screen comment track at a target bullet-screen comment layer, further comprising:
in response to a plurality of bullet-screen comment tracks at the target bullet-screen comment layer meeting that the target distance is not less than the minimum distance, determining that a bullet-screen comment track with a longest target distance is the target bullet-screen comment track.

10. A computer device, wherein the computer device comprises a memory, a processor, and computer-readable instructions stored in the memory and capable of running on the processor, and when the computer-readable instructions are executed by the processor, the processor performs operations comprising:
obtaining a to-be-displayed bullet-screen comment;
placing the to-be-displayed bullet-screen comment into a target bullet-screen comment track at a target bullet-screen comment layer when the to-be-displayed bullet-screen comment meets a preset placement condition, wherein the target bullet-screen comment layer is one of several bullet-screen comment layers, bullet-screen comment tracks at each bullet-screen comment layer respectively have a same bullet-screen comment track width, and the target bullet-screen comment track is one of bullet-screen comment tracks at the target bullet-screen comment layer; and
displaying the to-be-displayed bullet-screen comment in the target bullet-screen comment track based on a bullet-screen comment configuration, wherein the bullet-screen comment configuration comprises at least a preset angle between a moving direction of the to-be-displayed bullet-screen comment and a horizontal direction or a vertical direction,
wherein the operations performed by the processor further comprise:
before the obtaining a to-be-displayed bullet-screen comment, determining a bullet-screen comment track width at each bullet-screen comment layer based on the preset angle, and determining start location coordinates of each bullet-screen comment track based on the bullet-screen comment track width; and
the placing the to-be-displayed bullet-screen comment into a target bullet-screen comment track at a target bullet-screen comment layer comprises:
placing the to-be-displayed bullet-screen comment into the target bullet-screen comment track based on start location coordinates of the target bullet-screen comment track.

11. The computer device according to claim 10, wherein the determining a bullet-screen comment track width at each bullet-screen comment layer based on the preset angle, and determining start location coordinates of each bullet-screen comment track based on the bullet-screen comment track width comprises:
determining a minimum bullet-screen comment track width at each bullet-screen comment layer based on the preset angle;
obtaining a quantity of bullet-screen comment tracks at the bullet-screen comment layer and a size of a bullet-screen comment display area, and determining a target bullet-screen comment track width based on the quantity of bullet-screen comment tracks and the size of the bullet-screen comment display area;
determining the start location coordinates of each bullet-screen comment track based on the target bullet-screen comment track width in response to the target bullet-screen comment track width being greater than the minimum bullet-screen comment track width; and
determining the start location coordinates of each bullet-screen comment track based on the minimum bullet-screen comment track width in response to the target bullet-screen comment track width being less than or equal to the minimum bullet-screen comment track width.

12. The computer device according to claim 11, wherein the placing the to-be-displayed bullet-screen comment into the target bullet-screen comment track based on start location coordinates of the target bullet-screen comment track comprises:
determining remaining space of the target bullet-screen comment track based on the minimum bullet-screen comment track width;

determining bullet-screen comment start location coordinates of the to-be-displayed bullet-screen comment based on the remaining space and the start location coordinates; and placing the to-be-displayed bullet-screen comment into the target bullet-screen comment track based on the bullet-screen comment start location coordinates.

13. The computer device according to claim 11, wherein the determining a minimum bullet-screen comment track width at each bullet-screen comment layer based on the preset angle comprises:

determining a maximum size of a bullet-screen comment and the size of the bullet-screen comment display area; and determining the minimum bullet-screen comment track width based on the preset angle, the maximum size of the bullet-screen comment, and the size of the bullet-screen comment display area.

14. A non-transitory computer-readable storage medium, wherein the computer-readable storage medium stores computer-readable instructions, and when the computer-readable instructions are executed by a processor, the processor performs operations comprising:

obtaining a to-be-displayed bullet-screen comment;

placing the to-be-displayed bullet-screen comment into a target bullet-screen comment track at a target bullet-screen comment layer when the to-be-displayed bullet-screen comment meets a preset placement condition, wherein the target bullet-screen comment layer is one of several bullet-screen comment layers, bullet-screen comment tracks at each bullet-screen comment layer respectively have a same bullet-screen comment track width, and the target bullet-screen comment track is one of bullet-screen comment tracks at the target bullet-screen comment layer; and displaying the to-be-displayed bullet-screen comment in the target bullet-screen comment track based on a bullet-screen comment configuration, wherein the bullet-screen comment configuration comprises at least a preset angle between a moving direction of the to-be-displayed bullet-screen comment and a horizontal direction or a vertical direction, wherein the operations performed by the processor further comprise:

before the obtaining a to-be-displayed bullet-screen comment, determining a bullet-screen comment track width at each bullet-screen comment layer based on the preset angle, and determining start location coordinates of each bullet-screen comment track based on the bullet-screen comment track width; and the placing the to-be-displayed bullet-screen comment into a target bullet-screen comment track at a target bullet-screen comment layer comprises:

placing the to-be-displayed bullet-screen comment into the target bullet-screen comment track based on start location coordinates of the target bullet-screen comment track.

15. The non-transitory computer-readable storage medium according to claim 14, wherein the determining a bullet-screen comment track width at each bullet-screen comment layer based on the preset angle, and determining start location coordinates of each bullet-screen comment track based on the bullet-screen comment track width comprises:

determining a minimum bullet-screen comment track width at each bullet-screen comment layer based on the preset angle;

obtaining a quantity of bullet-screen comment tracks at the bullet-screen comment layer and a size of a bullet-screen comment display area, and determining a target bullet-screen comment track width based on the quantity of bullet-screen comment tracks and the size of the bullet-screen comment display area;

determining the start location coordinates of each bullet-screen comment track based on the target bullet-screen comment track width in response to the target bullet-screen comment track width being greater than the minimum bullet-screen comment track width; and determining the start location coordinates of each bullet-screen comment track based on the minimum bullet-screen comment track width in response to the target bullet-screen comment track width being less than or equal to the minimum bullet-screen comment track width.

16. The non-transitory computer-readable storage medium according to claim 14, wherein the placing the to-be-displayed bullet-screen comment into the target bullet-screen comment track based on start location coordinates of the target bullet-screen comment track comprises:

determining remaining space of the target bullet-screen comment track based on the minimum bullet-screen comment track width;

determining bullet-screen comment start location coordinates of the to-be-displayed bullet-screen comment based on the remaining space and the start location coordinates; and placing the to-be-displayed bullet-screen comment into the target bullet-screen comment track based on the bullet-screen comment start location coordinates.

17. The non-transitory computer-readable storage medium according to claim 14, wherein the determining a minimum bullet-screen comment track width at each bullet-screen comment layer based on the preset angle comprises:

determining a maximum size of a bullet-screen comment and the size of the bullet-screen comment display area; and determining the minimum bullet-screen comment track width based on the preset angle, the maximum size of the bullet-screen comment, and the size of the bullet-screen comment display area.

* * * * *